(12) United States Patent
Vecoven et al.

(10) Patent No.: US 12,417,154 B1
(45) Date of Patent: Sep. 16, 2025

(54) INPUT/OUTPUT SYSTEM INTERCONNECT REDUNDANCY AND FAILOVER

(71) Applicant: Enfabrica Corporation, Mountain View, CA (US)

(72) Inventors: Frederic Vecoven, Mountain View, CA (US); Shrijeet Mukherjee, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

(21) Appl. No.: 19/034,371

(22) Filed: Jan. 22, 2025

(51) Int. Cl.
*G06F 11/00* (2006.01)
*G06F 11/16* (2006.01)
*G06F 11/20* (2006.01)

(52) U.S. Cl.
CPC ...... *G06F 11/1616* (2013.01); *G06F 11/1625* (2013.01); *G06F 11/2023* (2013.01)

(58) Field of Classification Search
CPC ............ G06F 11/1616; G06F 11/1625; G06F 11/2023; G06F 11/0745; G06F 11/2017; G06F 2213/0026; G06F 13/4022
See application file for complete search history.

(56) References Cited

U.S. PATENT DOCUMENTS

| | | | |
|---|---|---|---|
| 6,594,712 B1 | 7/2003 | Pettey et al. |
| 6,667,974 B1 | 12/2003 | Shigeta |
| 7,181,541 B1 | 2/2007 | Burton et al. |
| 7,191,225 B1 | 3/2007 | Borthakur |
| 7,245,586 B2 | 7/2007 | Bitar et al. |
| 7,293,129 B2 | 11/2007 | Johnsen et al. |
| 7,697,422 B1 | 4/2010 | Arad et al. |
| 7,937,447 B1 | 5/2011 | Cohen et al. |
| 8,234,407 B2 | 7/2012 | Sugumar et al. |
| 8,301,717 B2 | 10/2012 | Deshpande |
| 8,719,456 B2 | 5/2014 | Wilkinson |

(Continued)

FOREIGN PATENT DOCUMENTS

| | | |
|---|---|---|
| EP | 2768188 A1 | 8/2014 |
| EP | 3661141 A1 | 6/2020 |

(Continued)

OTHER PUBLICATIONS

Sankar, Rochan "Foundational Fabrics for AI: Introducing the Accelerated Compute Fabric Switch", AI Hardware Summit, Sep. 13, 2023 (Year: 2023).*

(Continued)

*Primary Examiner* — Joseph D Manoskey
(74) *Attorney, Agent, or Firm* — Goodwin Procter LLP (57) ABSTRACT

A system and method for achieving peripheral component interconnect express (PCIe) redundancy and recovery are disclosed. In some embodiments, the system comprises an accelerated compute fabric (ACF) comprising a PCIe switch, an application host communicatively coupled to the ACF using one or more upstream PCIe links, and an endpoint device communicatively coupled to the ACF using one or more downstream PCIe links. The application host is configured to send PCIe transaction layer packets (TLP) addressed to the ghosted endpoint devices through the one or more upstream PCIe links, and the ACF is configured to redirect the PCIe TLP packets to the endpoint device through the one or more downstream PCIe links.

20 Claims, 5 Drawing Sheets

(56) References Cited

U.S. PATENT DOCUMENTS

| | | | |
|---|---|---|---|
| 8,917,734 B1 | 12/2014 | Brown |
| 9,164,702 B1 | 10/2015 | Nesbit et al. |
| 9,448,901 B1 | 9/2016 | Aslam et al. |
| 9,648,102 B1 | 5/2017 | Davis et al. |
| 9,684,597 B1 | 6/2017 | Eiriksson |
| 9,690,739 B2 | 6/2017 | Shao et al. |
| 9,864,519 B2 | 1/2018 | Meyer et al. |
| 9,934,152 B1 | 4/2018 | Bryant et al. |
| 9,940,123 B1 | 4/2018 | Ayoub et al. |
| 10,152,428 B1 | 12/2018 | Alshawabkeh et al. |
| 10,169,279 B2 | 1/2019 | Yokoyama |
| 10,374,945 B1 | 8/2019 | Dhanabalan et al. |
| 10,447,767 B2 | 10/2019 | Baptist et al. |
| 10,503,658 B2 | 12/2019 | Basu et al. |
| 10,778,521 B2 | 9/2020 | Liguori et al. |
| 10,880,204 B1 | 12/2020 | Shalev et al. |
| 10,931,588 B1 | 2/2021 | Matthews et al. |
| 10,944,660 B2 | 3/2021 | Hurson et al. |
| 2001/0046212 A1 | 11/2001 | Nakajima |
| 2002/0071450 A1 | 6/2002 | Gasbarro et al. |
| 2002/0078271 A1 | 6/2002 | Berry |
| 2002/0129272 A1 | 9/2002 | Terrell et al. |
| 2002/0159385 A1 | 10/2002 | Susnow et al. |
| 2002/0184452 A1 | 12/2002 | Simmons et al. |
| 2002/0191599 A1 | 12/2002 | Parthasarathy et al. |
| 2003/0058875 A1 | 3/2003 | Arndt et al. |
| 2003/0154412 A1 | 8/2003 | Hetzler et al. |
| 2004/0049603 A1 | 3/2004 | Boyd et al. |
| 2005/0068798 A1 | 3/2005 | Lee et al. |
| 2005/0080920 A1 | 4/2005 | Bender et al. |
| 2005/0089033 A1 | 4/2005 | Gupta et al. |
| 2005/0223118 A1 | 10/2005 | Tucker et al. |
| 2006/0004941 A1 | 1/2006 | Shah et al. |
| 2006/0056308 A1 | 3/2006 | Gusat et al. |
| 2006/0056405 A1 | 3/2006 | Chang et al. |
| 2006/0059242 A1 | 3/2006 | Blackmore et al. |
| 2006/0090014 A1* | 4/2006 | Wong .............. G06F 13/423 710/10 |
| 2006/0236063 A1 | 10/2006 | Hausauer et al. |
| 2006/0242352 A1 | 10/2006 | Torudbakken et al. |
| 2006/0251109 A1 | 11/2006 | Muller et al. |
| 2006/0253619 A1 | 11/2006 | Torudbakken et al. |
| 2006/0271713 A1 | 11/2006 | Xie et al. |
| 2007/0038794 A1 | 2/2007 | Purcell et al. |
| 2007/0104102 A1 | 5/2007 | Opsasnick |
| 2007/0255802 A1 | 11/2007 | Aloni et al. |
| 2007/0283123 A1 | 12/2007 | Vick et al. |
| 2008/0031266 A1 | 2/2008 | Tallet et al. |
| 2008/0043732 A1 | 2/2008 | Desai et al. |
| 2008/0168194 A1 | 7/2008 | Gregg et al. |
| 2009/0083392 A1 | 3/2009 | Wong et al. |
| 2009/0113143 A1 | 4/2009 | Domsch et al. |
| 2009/0172301 A1 | 7/2009 | Ebersole et al. |
| 2010/0064070 A1 | 3/2010 | Yoshimura et al. |
| 2010/0103837 A1 | 4/2010 | Jungck et al. |
| 2010/0161870 A1* | 6/2010 | Daniel ............... H04L 69/16 710/314 |
| 2010/0232448 A1 | 9/2010 | Sugumar et al. |
| 2010/0312850 A1 | 12/2010 | Deshpande |
| 2011/0072204 A1 | 3/2011 | Chang et al. |
| 2011/0072234 A1 | 3/2011 | Chinya et al. |
| 2011/0268119 A1 | 11/2011 | Pong et al. |
| 2011/0271010 A1 | 11/2011 | Kenchammana et al. |
| 2012/0166690 A1* | 6/2012 | Regula ............... G06F 13/404 710/104 |
| 2013/0024591 A1 | 1/2013 | Sun |
| 2013/0031328 A1 | 1/2013 | Kelleher et al. |
| 2013/0132536 A1 | 5/2013 | Zhang et al. |
| 2013/0318322 A1 | 11/2013 | Shetty et al. |
| 2014/0237156 A1 | 8/2014 | Regula et al. |
| 2015/0026286 A1 | 1/2015 | Sharp et al. |
| 2015/0082000 A1 | 3/2015 | Hong et al. |
| 2015/0089009 A1 | 3/2015 | Tsirkin et al. |
| 2016/0070475 A1 | 3/2016 | Zhang et al. |
| 2016/0085450 A1 | 3/2016 | Ahn et al. |
| 2016/0094553 A1 | 3/2016 | Azgin et al. |
| 2016/0162422 A1 | 6/2016 | Weber |
| 2016/0269305 A1 | 9/2016 | Sreeramoju et al. |
| 2017/0097909 A1 | 4/2017 | Simionescu et al. |
| 2017/0132148 A1 | 5/2017 | Liu et al. |
| 2017/0177520 A1 | 6/2017 | Kampe et al. |
| 2017/0177528 A1 | 6/2017 | Harriman et al. |
| 2017/0185528 A1 | 6/2017 | Hansson et al. |
| 2017/0372088 A1 | 12/2017 | Zhao et al. |
| 2018/0004703 A1* | 1/2018 | Sharma .............. G06F 13/4072 |
| 2018/0024938 A1 | 1/2018 | Paltashev et al. |
| 2018/0046411 A1 | 2/2018 | Coburn et al. |
| 2018/0052793 A1* | 2/2018 | Fang .................. G06F 13/4027 |
| 2018/0176134 A1 | 6/2018 | Pignataro et al. |
| 2018/0191623 A1 | 7/2018 | Marty et al. |
| 2018/0198715 A1 | 7/2018 | Shmilovici et al. |
| 2018/0241629 A1 | 8/2018 | Sato et al. |
| 2018/0359219 A1 | 12/2018 | Israel et al. |
| 2019/0102310 A1 | 4/2019 | Ramrakhyani et al. |
| 2019/0116121 A1 | 4/2019 | Friedman et al. |
| 2019/0141041 A1 | 5/2019 | Bhabbur et al. |
| 2019/0173810 A1 | 6/2019 | Shpiner et al. |
| 2019/0220425 A1 | 7/2019 | Zemach et al. |
| 2019/0258415 A1 | 8/2019 | Imamura |
| 2019/0294366 A1 | 9/2019 | Kawamura et al. |
| 2019/0320019 A1 | 10/2019 | Hamrick, Jr. |
| 2019/0324917 A1 | 10/2019 | Cui et al. |
| 2019/0334828 A1 | 10/2019 | Fairhurst et al. |
| 2019/0370173 A1 | 12/2019 | Boyer et al. |
| 2019/0379767 A1 | 12/2019 | Sharma et al. |
| 2020/0004685 A1 | 1/2020 | Guim Bernat et al. |
| 2020/0119753 A1 | 4/2020 | Chirca et al. |
| 2020/0159669 A1 | 5/2020 | Duncan et al. |
| 2020/0177513 A1 | 6/2020 | Zhang |
| 2020/0204489 A1 | 6/2020 | Pianigiani et al. |
| 2020/0236052 A1 | 7/2020 | Srinivasan et al. |
| 2020/0280518 A1 | 9/2020 | Lee et al. |
| 2020/0371955 A1 | 11/2020 | Goodacre et al. |
| 2020/0387405 A1 | 12/2020 | Xiao et al. |
| 2021/0019069 A1 | 1/2021 | Sen et al. |
| 2021/0037107 A1 | 2/2021 | Klenk et al. |
| 2021/0075633 A1 | 3/2021 | Sen et al. |
| 2021/0083981 A1 | 3/2021 | Shmilovici et al. |
| 2021/0132999 A1 | 5/2021 | Haywood et al. |
| 2021/0232312 A1 | 7/2021 | Prasad et al. |
| 2021/0234706 A1 | 7/2021 | Nair et al. |
| 2021/0318961 A1 | 10/2021 | Peterson et al. |
| 2021/0345112 A1 | 11/2021 | Elliott et al. |
| 2022/0004512 A1 | 1/2022 | Cannata et al. |
| 2022/0060422 A1 | 2/2022 | Sommers |
| 2022/0085916 A1 | 3/2022 | Debbage et al. |
| 2022/0109587 A1 | 4/2022 | Sapio et al. |
| 2022/0197787 A1 | 6/2022 | Han et al. |
| 2022/0200906 A1 | 6/2022 | Ye et al. |
| 2022/0214912 A1 | 7/2022 | Julien et al. |
| 2022/0217085 A1 | 7/2022 | Sankar et al. |
| 2022/0222118 A1 | 7/2022 | Wang et al. |
| 2022/0248251 A1 | 8/2022 | Ryu et al. |
| 2022/0283964 A1 | 9/2022 | Burstein et al. |
| 2022/0291875 A1 | 9/2022 | Diaz-Cuellar et al. |
| 2023/0044342 A1 | 2/2023 | Wilkinson |
| 2023/0051781 A1 | 2/2023 | Patel et al. |
| 2023/0093247 A1 | 3/2023 | Kumar et al. |
| 2023/0096451 A1 | 3/2023 | Johnson et al. |
| 2024/0028209 A1 | 1/2024 | Berke et al. |
| 2024/0098023 A1 | 3/2024 | Guo |
| 2024/0104045 A1 | 3/2024 | Norrie et al. |
| 2024/0296138 A1 | 9/2024 | Helps et al. |
| 2024/0414087 A1 | 12/2024 | Ranjan et al. |

FOREIGN PATENT DOCUMENTS

| | | |
|---|---|---|
| WO | WO-2005106693 A2 | 11/2005 |
| WO | WO-2009120798 A2 | 10/2009 |
| WO | WO-2020055921 A1 | 3/2020 |
| WO | WO-2022/005322 A1 | 1/2022 |
| WO | WO-2022108498 A1 | 5/2022 |

(56) References Cited

FOREIGN PATENT DOCUMENTS

| WO | WO-2022198552 | 9/2022 |
| WO | WO-2022198552 A1 | 9/2022 |
| WO | WO-2024102915 A1 | 5/2024 |

OTHER PUBLICATIONS

Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Jul. 3, 2022 from: <https://www.businesswire.com/news/home/20141215005718/en/Emulex-provides-10Gb-Ethernet-Virtual-Fabric-Adapter-5-New-Lenovo-Ervers>entire document.

International Search Report and Written Opinion for International Patent Application No. PCT/US2022/011491, dated Mar. 24, 2022 (8 pages).

International Selarch Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

International Search Report and Written Opinion for International Patent Application No. PCT/US2023/062168, dated May 12, 2023 (54 pages).

International Search Report and Written Opinion for International Patent Application No. PCT/US2023/61405, dated Jul. 11, 2023 (6 pages).

International Search Report and Written Opinion for International Patent Application No. PCT/US2023/082132, dated Jun. 6, 2024 (8 pages).

International Search Report and Written Opinion for International Patent Application No. PCT/US2024/029723, dated Aug. 22, 2024 (14 pages).

International Search Report and Written Opinion for International Patent Application No. PCT/US2023/029887, dated Oct. 26, 2023 (13 pages).

"Using Non-transparent Bridging in PCI Express Systems," by Jack Regula, 20040601, Jun. 1, 2004, pp. 4-30, XP002686987, U RL: http://www.plxtech.com/files/pdf/technical/expresslane/NontransparentBridging.pdf.

International Search Report and Written Opinion for International Patent Application No. PCT/US2024/039765, dated Oct. 22, 2024 (15 pages).

European Search Report for European Patent Application No. EP 22737124.2, dated Jan. 23, 2025 (6 pages).

Extended European Search Report for European Patent Application No. EP 22856810.1, dated May 30, 2025 (9 pages).

Partial European Search Report for European Patent Application No. EP 22821030.8, dated Apr. 9, 2025 (15 pages).

U.S. Appl. No. 17/570,261, filed Jan. 6, 2022, Server Fabric Adapter for I/O Scaling of Heterogeneous and Accelerated Compute Systems, Rochan Sankar, et al.

U.S. Appl. No. 18/747,118, filed Jun. 18, 2024, Optimally Balanced Network Systems, Rochan Sankar, et al.

U.S. Appl. No. 18/778,611, filed Jul. 19, 2024, Server Fabric Adapter for I/O Scaling of Heterogeneous and Accelerated Compute Systems, Rochan Sankar, et al.

U.S. Appl. No. 19/037,768, filed Jan. 27, 2025, Server Fabric Adapter for I/O Scaling of Heterogeneous and Accelerated Compute Systems, Rochan Sankar, et al.

U.S. Appl. No. 17/836,532, filed Jun. 9, 2022, Transparent Remote Memory Access over Network Protocol, Norrie, et al.

U.S. Appl. No. 18/755,372, filed Jun. 26, 2024, Transparent Remote Memory Access over Network Protocol, Thomas Norrie, et al.

U.S. Appl. No. 19/172,409, filed Apr. 7, 2025, Transparent Remote Memory Access over Network Protocol, Thomas Norrie, et al.

U.S. Appl. No. 17/886,026, filed Aug. 11, 2022, System and Method for Congestion Control Using a Flow Level Transmit Mechanism, Shrijeet Mukherjee et al.

U.S. Appl. No. 18/102,033, filed Jan. 26, 2023, System and Method for One-Sided Read RMA Using Linked Queues, Shrijeet Mukerjee, et al.

U.S. Appl. No. 18/107,324, filed Feb. 8, 2023, System and Method for Using Dynamic Thresholds With Route Isolation for Heterogeneous Traffic in Shared Memory, Ari Aravinthan, et al.

U.S. Appl. No. 18/447,180, filed Aug. 9, 2023, System and Method for Ghost Bridging, Thomas Norrie, et al.

U.S. Appl. No. 19/046,232, filed Feb. 5, 2025, System and Methods for Ghost Bridging, Thomas Norrie et al.

U.S. Appl. No. 18/666,548, filed May 16, 2024, System and Method for an Optimized Staging Buffer for Broadcast/Multicast Operations, Shrijeet Mukherjee, et al.

U.S. Appl. No. 18/526,727, filed Dec. 1, 2023, A Modular Datacenter Interconnection System, David Skirmont, et al.

U.S. Appl. No. 18/785,542, filed Jul. 26, 2024, Method and System for Tracking and Moving Pages Within a Memory Hierarchy, Shrijeet Mukhrjee, et al.

U.S. Appl. No. 18/920,558, filed Oct. 18, 2024, System and Method for Optimally Balanced Network Multipathing, Shrijeet Mukhrjee, et al.

International Search Report and Written Opinion for International Patent Application No. PCT/US2025/012514, dated Jul. 30, 2025 (11 pages).

\* cited by examiner

INPUT/OUTPUT SYSTEM INTERCONNECT REDUNDANCY AND FAILOVER

TECHNICAL FIELD

Embodiments of this disclosure relate to computer input/output (I/O) systems and methods and, in some examples, to redundant I/O systems and methods that provide rapid system failover without causing measurable performance and bandwidth penalties, and without substantial hardware or software overheads.

BACKGROUND

Peripheral component interconnect express (PCIe) is designed to provide a scalable, high-speed, and flexible architecture for connecting various devices (e.g., central processing units (CPUs), memory, network interface cards, etc.) in a computer system. A PCIe hierarchy, however, usually connects various endpoint devices to a single host (e.g., CPU) through a single root port, which significantly limits the system performance. For example, due to the single root port structure, a single error may cause the loss of connectivity to all the devices in the PCIe hierarchy, and the loss of connectivity is specifically detrimental to machine learning (ML) and/or artificial intelligence (AI) environments built with a multitude of devices.

Hence, an efficient approach that provides error robustness and recovery for PCIe systems is desired.

SUMMARY

To address the shortcomings mentioned above, a method and system for achieving peripheral component interconnect express (PCIe) redundancy and recovery are disclosed herein. In some aspects, the disclosed system may include an accelerated compute fabric (ACF) including a PCIe switch, an application host communicatively coupled to the ACF using one or more upstream PCIe links, and an endpoint device communicatively coupled to the ACF using one or more downstream PCIe links. The application host is configured to send PCIe transaction layer packets (TLP) addressed to a plurality of ghosted endpoint devices through the one or more upstream PCIe links. The ACF is configured to redirect the PCIe TLP packets to the endpoint device through the one or more downstream PCIe links.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles, and features explained herein may be employed in various and numerous embodiments.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In various examples, a "controlling host" (alternatively referred to as "infra host") can be or include a compute server, a compute node, or other computing device capable of controlling and/or coordinating one or more operations of a plurality of application hosts. One or more controlling hosts may control or influence network communication within a network, as described herein. For example, a fabric adapter or accelerated compute fabric can receive information from a controlling host and can use the information to select network paths and/or network ports for sending packets over the network and balancing network loads. In some embodiments, in a networked environment having a variety of application hosts, the controlling hosts may process packet headers according to one or more network protocols used in the network.

In various examples, an "application processor" (alternatively referred to as "application host") can be or include a compute server, a compute node, or other computing device capable of running one or more applications. For instance, an application processor can run a machine learning application, an artificial intelligence application, an email application, a web browser application, a word processing application, a spreadsheet application, other type of application, or any combination thereof. In some embodiments, in a networked environment having a variety of application hosts, the application processors may operate on one or more packet payloads.

In various examples, an "endpoint device" or "endpoint" may be a peripheral device that is connected to a PCIe bus, receives and transmits data, and performs specific functions within a PCIe system. An endpoint device may be or include, for example, a graphics processing unit (GPU), a storage or memory element (e.g., solid state drives (SSD), hard disk drives (HHD)), a network interface card (NIC), field-programmable gate array (FPGA), or other peripheral devices that interface with a CPU or system memory via the PCIe bus.

In various examples, a "ghosted endpoint device" can be or include a virtual or ghost copy of an endpoint device.

In various examples, a "PCIe hierarchy" can be or include an arrangement of components that define communication pathways in a PCIe system. The components of a PCIe hierarchy may include, for example, application processors, root complexes, switches, endpoint devices, PCIe interfaces, and/or PCIe links.

In various examples, a "PCIe interface" can be or include a physical connector on a motherboard or expansion board that allows a PCIe device to connect to a computer's internal data bus.

In various examples, a "PCIe link" can be, include, or provide a high-speed communication channel between two PCIe devices (e.g., including an accelerated compute fabric, a controlling host, an application host, or an endpoint device). For example, a PCIe link can provide a communication channel between an accelerated compute fabric and a controlling host, an application host, or an endpoint device.

In various examples, a "size" or "width" of a PCIe link can refer to a number of lanes in the PCIe link and/or can refer to a maximum bandwidth or transfer rate associated with the PCIe link. Examples of PCIe link sizes include ×1, ×2, ×4, ×8, and ×16, which can have 1, 2, 4, 8, and 16 lanes, respectively.

Technical Challenges of I/O Interconnect and Existing Solutions

In general, PCIe is a serial computer expansion bus that is widely used as a general purpose memory mapped interconnect for systems that require high-speed and low-latency connectivity among multiple processing elements, or between processing elements and endpoint devices. A processing element may be a controlling host (root complex) that manages the overall operation of the PCIe hierarchy or an application host running software applications or services (e.g., ML and/or AI applications). An endpoint (e.g., GPU, SSD, NIC, or AI accelerator) may communicate with the processing element to perform functions such as data processing, storage, or networking.

A typical PCIe hierarchy is a tree that fans out of a single root port. A root port may act as an interface to connect the CPU and memory of a host system to PCIe devices. When there is only a single root port, all the endpoint devices in the PCIe hierarchy are visible and available to only a single host through the single root port. The single host bridging restriction can make it difficult or even impossible to share endpoint devices among multiple servers, and approaches such as peer-to-peer communication and non-transparent bridging may be required to overcome this restriction.

More importantly, in a PCIe hierarchy having a single root port, a single uncorrectable error in any interconnect point of the hierarchy may result in a loss of connectivity to some or all the devices in the hierarchy and/or may require cumbersome recovery procedures. For example, an uncorrectable error detected by forward error correction (FEC) may require multiple retransmissions of a bit stream. If these retransmissions, however, fail to resolve the error condition, the error is considered to be fatal. To recover from these catastrophic events, at a minimum, a link reset, re-negotiation and re-training, and/or re-enumeration of the entire hierarchy may be required, and in some instances the entire system may be forced to reboot. Such recovery procedures can be extremely disruptive to modern applications (e.g., ML and/or AI model training) that take a long time (e.g., weeks or months) to complete, thereby substantially increasing operational overheads. For example, re-enumeration of a PCIe hierarchy may include time- and resource-intensive steps, such as device discovery, device identification, resource allocation, device configuration, and driver loading, for each device in the hierarchy.

The above catastrophic effects have become more problematic with rapid growth of high-performance applications and systems. For example, current disaggregated ML and AI systems are built using a multitude of CPUs, GPUs, and endpoint devices. These components/devices may be interconnected using printed circuit board (PCB) traces and connectors, copper cables, and/or fiber-optic transceivers and cables. When interconnect errors occur during run time of an application in such an environment, some or all the devices will be disconnected to cause a disruptive effect. It is therefore advantageous to provide an error robustness and recovery mechanism for PCIe systems to secure critical interconnects.

PCIe Error Recovery

In general, PCIe error recovery refers to mechanisms that handle and recover from various types of errors (e.g., link-level error or flow control error) that may occur in a PCIe system, ensuring that communication between devices (e.g., host and/or endpoint devices) remains reliable and fault-tolerant. Upon detecting an error, a PCIe error recovery mechanism may mask the error (if minor), retrain a PCIe link (e.g., by adjusting speed, width, or other parameters), reset the link, recover or failover to backup data, etc.

Traditional approaches for accomplishing PCIe error recovery are based on a level of redundancy in the PCIe interconnect. Redundancy in PCIe systems refers to the inclusion of backup or failover mechanisms in the interconnect of devices to ensure system reliability and availability (e.g., particularly in mission-critical applications such as servers, data centers, etc.). Redundancy can be implemented at various layers (e.g., physical layer and/or data transmission layer) of the PCIe systems and/or in the system architecture itself.

A current PCIe error recovery mechanism is to fall back to a narrower and lower bandwidth interface (if possible) when an error occurs. For example, redundancy may be implemented by allowing a PCIe connection to operate in different configurations such as ×1, ×4, ×8, or ×16 lanes. When experiencing error(s) in one or a few lanes, a 16-lane (×16) PCIe interface/slot can be reduced to an 8-lane (×8) PCIe interface that excludes the problematic lane(s), so that the PCIe system can still function using the remaining functional lanes. This method can be straightforward and easy to implement, but it suffers from the above-mentioned shortcomings (e.g., disruptive link reset, re-negotiation, re-enumeration, etc.). Moreover, after an error has been removed (e.g., a lane failure is fixed), restoring a PCIe connection/link to its original state may require the same level of disruption as degrading it.

Another current PCIe error recovery mechanism is to bifurcate a single interface/slot (e.g., ×16) into multiple slower interfaces/slots (e.g., 2×8, 4×4). Each of the multiple interfaces/slots has a separate end-to-end hierarchy, and these interfaces and their hierarchies can serve as either hot or cold standbys. Bifurcation allows a single PCIe connection to be split into multiple smaller connections/links such that multiple devices can share the bandwidth of one PCIe interface/slot. Using this method, the overall bandwidth remains the same as the non-bifurcated interface for multiple communicating applications. The connection for a single application, however, may only operate in a degraded (e.g., lower bandwidth) state. For example, an AI application may use an ×16 PCIe link. When this link is bifurcated into two ×8 links, the AI application may be able to operate sufficiently using just the first ×8 link, and the second, stand-by ×8 link may be used by a different application. When the first ×8 link is broken, the second, stand-by ×8 link can be taken over by the AI application. Thus, during normal operation and/or when a link failure occurs, the AI application may use only one ×8 link. The process of failover from one interface to another interface using this method is relatively complex (from the application's perspective) since both the root complex (host) and the endpoint device may need to bind the application to a different hierarchy (e.g., a different slot). The same challenges faced by the first method discussed above also exist when the PCIe link is restored to its original state.

Overview of Proposed Solution

Advantageously, in various examples, the present disclosure describes a fully redundant system and method with seamless failover. This fully redundant system and method may provide rapid system failover in the presence of an error (e.g., link/connection error), without causing measurable performance and bandwidth penalties under error-free conditions or requiring any substantial hardware or software overheads.

The approach described herein includes some unique features. For example, the present approach may use a standard PCIe bifurcation mechanism to split a "fat" PCIe link (e.g. ×16) into multiple narrower links (e.g. 2×8, two ×8 links). In this way, the present approach may reuse most of the hardware resources, thereby avoiding a cost penalty.

Additionally or alternatively, the present approach may perform fine granularity data stripping across multiple PCIe links. In some embodiments, the present system may divide large chunks of data (e.g., packet or application data payloads) into smaller, more manageable parts (e.g., payload chunks) and distribute these data parts across multiple PCI links using a scatter gather list (SGL) data structure that manages data buffers. Since the present system can use SGL elements (SGLE) buffers to store data received from the same application but sent over multiple PCIe interfaces, the single-application bandwidth and throughput remain essentially the same as those of the original non-bifurcated interface. For example, in addition to using bifurcation to retain the same overall bandwidth of the original PCIe interface, the present redundant and failover system can employ an SGL/SGLE structure that manages data storage and distribution to retain the same bandwidth at an application level. Examples of SGL/SGLE-based fine granularity data stripping are described in U.S. patent application Ser. No. 18/747,118, titled "Optimally Balanced Network Systems," and filed on Jun. 18, 2024, the entire contents of which are incorporated by reference herein.

The present system may further utilize a ghost bridging approach to provide alternate redundant communication data paths represented by multiple separate PCIe hierarchies between a root port and connected devices. Examples of ghost bridging techniques are described in U.S. patent application Ser. No. 18/447,180, titled "System and Method for Ghost Bridging," and filed on Aug. 9, 2024, the entire contents of which are incorporated by reference herein. Using ghost bridging, a single endpoint device may be shared by multiple host servers simultaneously without any modification to the endpoint device. In some embodiments, the ghosting initialization and configuration of relevant root complexes and endpoint device(s), including their corresponding hierarchies, are performed before normal system operations, similar to traditional hierarchies. The ghosting configuration can remain permanently static (e.g., without changes for discovery, enumeration, etc.). Advantageously, this allows for rapid switch-over to a single hierarchy in the presence of an uncorrectable error condition and switch back to the original state after the error condition has been removed. Another advantage is that, from an application's perspective, little or no communication disruption may occur, except that a communication link may be slowed down until an error recovery action is completed. Further, a hardware footprint of a ghost device is extremely modest, making the cost penalty almost negligible.

Figure 1:
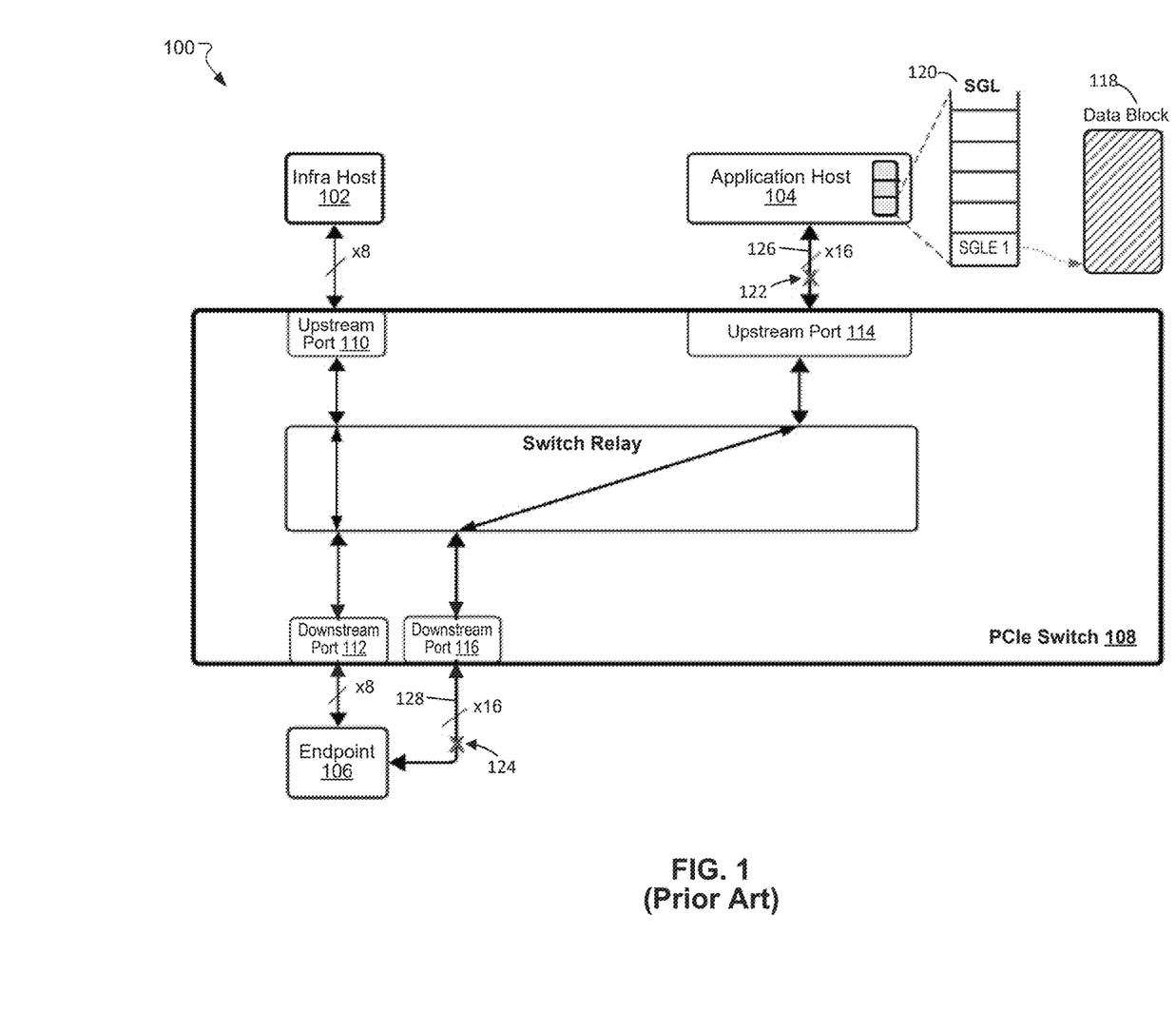
FIG. 1 includes an exemplary connectivity diagram of an existing PCIe system.

FIG. 1 illustrates an exemplary connectivity diagram of an existing PCIe system 100 in which two hosts share an endpoint device (e.g., SSD, HDD, NIC, etc.). The two hosts include a controlling/infra host 102 and an application host 104. Controlling or infra host 102 may be a root complex that manages the PCIe hierarchy and handles communication with PCIe devices (e.g., endpoints). Application host 104 may be a computing system that runs software applications or services (e.g., AI and/or ML) and leverages PCIe devices, such as an endpoint 106, to accelerate workloads and improve performance. In the example of FIG. 1, each of these hosts and endpoint(s) may communicate with the PCIe system through an ×16 link or ×8 link.

Traditional PCIe connectivity rules require each host 102 or 104 to create its own PCIe hierarchy to govern how devices are connected and communicate across the system. A PCIe hierarchy may include a host (e.g., 102 or 104), a root port, a PCIe switch, endpoint(s), downstream port(s), upstream port(s), etc. A root port may be part of the host that initiates and controls communication with PCIe devices (e.g., PCIe switch and/or endpoints). An upstream port may be a physical or logical interface on a PCIe device that allows the device to send data upward to the host. A downstream port is used to direct data traffic from a higher level (e.g., a host) to a lower level (e.g., a PCIe switch) of the PCIe hierarchy. For example, data may flow from endpoint 106 to infra host 102 upstream through a upstream port 110, and a response from infra host 102 can be sent back to endpoint 106 downstream through a downstream port 112. In the example of FIG. 1, both the upstream port 110 and downstream port 112 reside on a PCIe switch 108. The PCIe switch 108 can ensure communications between the host and PCIe devices by routing data packets between upstream and downstream ports as shown in the "switch relay" block.

In the depicted example, the infra host 102 and the application host 104 each has a respective PCIe hierarchy. The PCIe hierarchy for the infra host 102 includes, for example, the infra host 102 (and its root complex), the upstream port 110, the switch 108, the downstream port 112, and the endpoint 106. Likewise, the PCIe hierarchy for the application host 104 includes, for example, the application host (and its root complex), an upstream port 114, the switch 108, a downstream port 116, and the endpoint 106. The two PCIe hierarchies enable the endpoint 106 to be simultaneously discovered and enumerated by both hierarchies and/or components thereof. For example, the endpoint device 106 has two PCIe ports (e.g., physical interfaces) and can use the two ports to connect to the two downstream ports 112 and 116 on PCIe switch 108. PCIe switch 108 is configured to treat each downstream port as a separate endpoint device.

In the exemplary system 100 of FIG. 1, when application host 104 needs to move a block of data (e.g., data block 118) to endpoint device 106, application host 104 may create an SGL 120 and post the SGL 120 on a transmit submission queue. An SGL is a structure in the host memory that contains a list of memory buffer descriptors in SGLEs. Each SGLE may provide essential information about a buffer, including a buffer location (e.g., in a global memory space of the PCIe system) and a buffer size (e.g., in bytes). The SGL may include a single SGLE when the data block resides in a single contiguous buffer. The SGL may include more than one SGLE when the data block occupies multiple data buffers. The SGL feature benefits PCIe direct memory access (DMA) since the SGL/SGLE structure allows a PCIe device to read data from multiple memory regions or write data to multiple non-contiguous memory regions in one operation, thereby avoiding the use of large contiguous memory buffers and facilitating memory usage.

Using a PCIe DMA operation, an endpoint device may transfer data directly to and from system memory without involving a CPU. For example, when data block 118 is transferred from application host 104 to endpoint device 106 at a full rate (e.g., using PCIe x16-lanes), endpoint device 106 may initiate PCIe DMA operations to request access to the system memory, e.g., one or more data buffers pointed to by one or more SGLEs (e.g., SGLE 1) in SGL 120. When a PCIe link failure 122 or 124 occurs at either an upstream link 126 or a downstream link 128, as indicated by "X", the entire system 100 can no longer function until a corrective action is taken (e.g., to remove a link from a failed state). For example, failure 122 in upstream link 126 may prevent the execution of a buffer access command initiated by endpoint device 106. Likewise, data requested from a buffer cannot be transferred back to endpoint device 106 when failure 124 occurs in downstream link 128.

System Implementation

Figure 2:
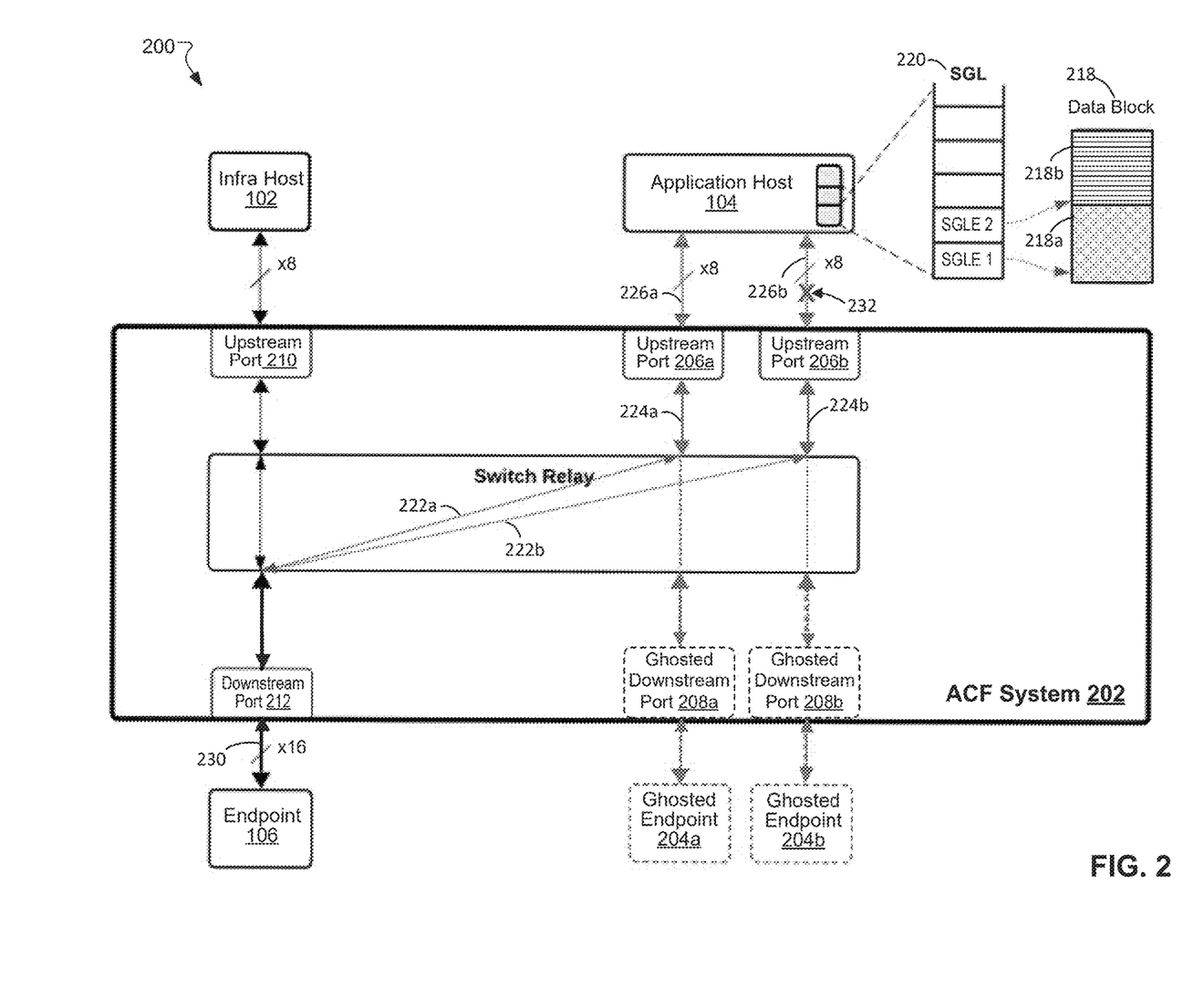
FIG. 2 includes an exemplary diagram of the present redundancy and failover system, according to some embodiments.

To overcome the shortcomings of existing systems (e.g., system 100), a novel redundancy and failover system 200 is described in FIG. 2, in accordance with certain examples. The system 200 uses an accelerated compute fabric (ACF) 202 to act as a network switch that, along with other system components, can (1) distribute data chunks from an application across multiple PCIe links without compromising the original bandwidth, and (2) ensure efficient switching between PCIe links when a link error is detected and after the link error is removed, without causing communication disruption on the running application. In various examples, the ACF 202 is a scalable and disaggregated I/O hub that manages I/O and network throughput across a composable and accelerated compute system. The ACF 202 can be or include a PCIe switch. An exemplary architecture of the ACF 202 applied in accelerated and/or heterogeneous computing systems is described below with reference to FIG. 6.

In FIG. 2, ACF 202 is configured to manage communications between infra host 102, application host 104, and endpoint 106. In the present system 200, infra host 102 connects to an upstream port 210, and endpoint device 106 connects to a downstream port 212, where both ports 210 and 212 are part of ACF 202. ACF 202 is configured to provide direct connectivity between infra host 102 and endpoint device 106 such that endpoint device 106 can be recognized and enumerated when infra host 102 creates its PCIe hierarchy.

The connectivity of application host 104, however, is very different from that shown in FIG. 1. Instead of providing a single PCIe x16 link, in system 200 of FIG. 2, the PCIe x16 link is bifurcated into two x8 links: a first upstream PCIe link 226a and a second upstream PCIe link 226b. Link 226a is connected to a physical upstream PCIe port 206a, and link 226b is connected to a separate physical upstream PCIe port 206b. Each PCIe link 226a or 226b is associated with its own PCIe hierarchy or flow path. While the depicted example includes x16 and x8 links, it is understood that other PCIe link sizes can be used (e.g., x4). In various examples, a sum of the PCIe link sizes for the upstream PCIe links 226a and 226b (e.g., x8+x8 =x16) can be equal to a PCIe link size used for one or more downstream PCIe links 230 for the endpoint device 106 (e.g., a single x16 link or two x8 links).

The present system may use ACF 202 to share and disaggregate PCIe devices across multiple host servers using a ghost bridging approach. In some embodiments, the present system may create a set of ghost transactions to bridge individual PCIe transactions (e.g., write, read) across independent PCIe hierarchies associated with multiple hosts. A ghost transaction is a transaction involving a ghost device, and a ghost device is a virtual or logical device that behaves as a standard PCIe device but does not implement any mission-mode functionality (e.g., data acquisition and processing, storage operations). In some embodiments, the ghost device may be used to provide information (e.g., PCIe device identifiers, memory space, tag data) for PCIe transaction layer packets (TLPs) that bridge between PCIe hierarchies. ACF 202 may be configured to process the TLPs through ghost devices, such as forwarding a TLP, rewriting a source identifier, rewriting a source tag, rewriting a destination address, rewriting the traffic class of the TLP, etc. The ghost transactions conducted through ghost devices can help connect real hosts and endpoints in different PCIe hierarchies, where a single I/O device (e.g., an endpoint) can be recognized and used by multiple hosts without making any modifications to the endpoint.

ACF 202 may be configured to provide two identical "ghost" copies of endpoint device 106. As depicted in FIG. 2, these two ghost devices are ghosted endpoint 204a and ghosted endpoint 204b. Each of the ghosted endpoints 204a and 204b is associated with a PCIe hierarchy. The first hierarchy may include upstream port 206a, ghosted downstream port 208a, and ghosted endpoint 204a associated with the first PCIe link 226a. The second hierarchy may include upstream port 206b, ghosted downstream port 208b, and ghosted endpoint 204b associated with the second PCIe link 226b. This configuration of ghosted endpoints creates the illusion for application host 104 that it owns or connects to two separate endpoint devices, with each endpoint device being associated with a respective PCIe hierarchy of application host 104. Therefore, when sending data block 218 to endpoint 106, application host 104 can utilize both PCIe links 226a and 226b in parallel to send data from the data block 218 (e.g., because application host 104 is trying to send the data to two ghosted endpoints 204a and 204b). In this way, application host 104 may operate with the original PCIe x16 bandwidth, rather than in a lower bandwidth mode (e.g., PCIe x8 bandwidth) as described above in traditional redundancy systems.

The ghost devices 204a, 204b and the downstream ports 208a, 208b, however, are only logical or virtual devices and ports and do not exist in reality (e.g., they are created with software or firmware and are not physical components), as indicated by the dash-lined connections and dash-lined boxes. ACF 202 may be configured to ghost endpoint device 106 in the hierarchy created by infra host 102, that is, any attempt to send data to ghosted devices 204a and 204b may be redirected by ACF 202 to the endpoint device 106 (a real or physical device), which is owned by infra host 102. For example, when application host 104 sends data block 218 in PCIe TLP packets addressed to ghosted endpoints 204a, 204b, the packets can be redirected by ACF 202 to endpoint device 106 using path 222a, path 224a, and PCIe link 226a on a first PCIe hierarchy or flow path, and path 222b, path 224b, and PCIe link 226b on a second PCIe hierarchy or flow path.

In some embodiments, ACF 202 may be configured to utilize an SGL's multiple SGLEs (e.g., two or more SGLEs) to create a PCIe interface bundle, for example, including two or more PCIe interfaces (e.g., two or more PCIe interfaces). The SGLEs contain the information (e.g., descriptors or pointers) that point to memory buffers residing on all the interfaces in the bundle, which can be used by ACF 202 to route packets of different flows (e.g., different endpoint locations) in parallel to the PCIe interfaces, thereby sharing the high bandwidth of the PCIe bundle. Other interconnect protocols such as compute express link (CXL) may be used by ACF 202 to create an interface bundle.

When the endpoint device 106 is a network interface controller (NIC), ACF 202 may separate a network packet into a header and one or more payloads (or smaller payload portions/chunks). ACF 202 may forward the header to the controlling host/infra host 102 to enable efficient caching and effective data prefetching. For example, the packet processing in the controlling host 102 may not be bottle-necked because processing packet headers may consume very little bandwidth. ACF 202 may be configured to map and forward the payloads or payload portions associated with different endpoints to different PCIe interfaces in the bundle. In some embodiments, ACF 202 may monitor and track bandwidth utilization or available memory capacity, and, when there is a limitation, remap one or more SGLEs of a PCIe interface.

To move a block of data 218 to endpoint device 106, as shown in FIG. 2, application host 104 divides the data block 218 into at least two separate sub-blocks 218a and 218b. Application host 104 creates an SGL 220 and posts the SGL 220 on a transmit submission queue. Unlike SGL 120 in FIG. 1, SGL 220 now contains at least two SGLEs (e.g., SGLE 1 and SGLE 2) that point to two buffers for moving the data sub-blocks 218a and 218b. The two sub-blocks are moved simultaneously using DMA operations that are initiated by ACF 202.

In certain implementations, for example, data block 218 can be sent from application host 104 to ACF 202 in TLP packets. For example, a first portion of data block 218 (e.g., sub-block 218a) can be included in one or more TLP packets delivered from application host 104 to ACF 202 using PCIe link 226a. Likewise, a second portion of data block 218 (e.g., sub-block 218b) can be included in one or more TLP packets delivered from application host 104 to ACF 202 using PCIe link 226b. In this way, application host 104 can utilize both PCIe links 226a and 226b to send data block 218 to ACF 202.

When a failure 232 occurs in link 226b, however, the application host 104 may stop attempting to send data through link 226b and may begin sending data only through link 226a. In such an instance, for example, data block 218 (e.g., including the first and second sub-blocks 218a and 218b) may be included in one or more TLP packets delivered from application host 104 to ACF 202 using only link 226a. Once the failure 232 is resolved and link 226b is reactivated, the application host 104 may resume sending TLP packets (e.g., including sub-blocks 218a and 218b) over both links 226a and 226b.

In certain examples, each PCIe link 226a and 226b used to send data from application host 104 to ACF 202 can be associated with a respective ghosted endpoint device 204a and 204b. For example, TLP packets sent over link 226a can be addressed (e.g., by application host 104) to ghosted endpoint device 204a. Likewise, TLP packets sent over link 226b can be addressed to ghosted endpoint device 204b. When the failure 232 occurs and link 226b is unavailable, any TLP packets that would otherwise be addressed to respective ghosted endpoint device 204b can be addressed (e.g., by application host 104) to ghosted endpoint device 204a and sent over link 226a. In this way, when the failure 232 occurs, any TLP packets that would otherwise be sent to either ghosted endpoint device 204a or 204b can be sent only to ghosted endpoint device 204a. As described herein, the ghosted endpoint devices 204a and 204b are virtual (not physical devices). TLP packets sent by application host 104 and addressed to the ghosted endpoint devices 204a and 204b can be redirected by ACF 202 to the endpoint 106.

While the example depicted in FIG. 2 includes two upstream PCIe links (links 226a and 226b), it is understood that the system 200 can include any number of upstream PCIe links (e.g., 2, 4, 6, or 8). In general, when one upstream PCIe link fails, the application host 104 can use the remaining upstream PCIe links and can address TLP packets to the ghosted endpoint devices associated with the remaining upstream PCIe links.

Although the above description refers to high bandwidth DMA traffic between an application host and an endpoint device, the same principles of redundancy and failover described herein also apply to memory-mapped input/output (MMIO or load/store) traffic between the two entities. Additionally, while FIG. 2 is mainly described in the context of data transfer from an application host to an endpoint device for clarity and brevity, the same concepts and principles described herein also apply to the data traffic that moves in an opposite direction. In that case, the present system may configure the SGLs/SGLEs to reside on a receive submission queue and point to empty memory buffers where the blocks of data are stored.

Figure 3:
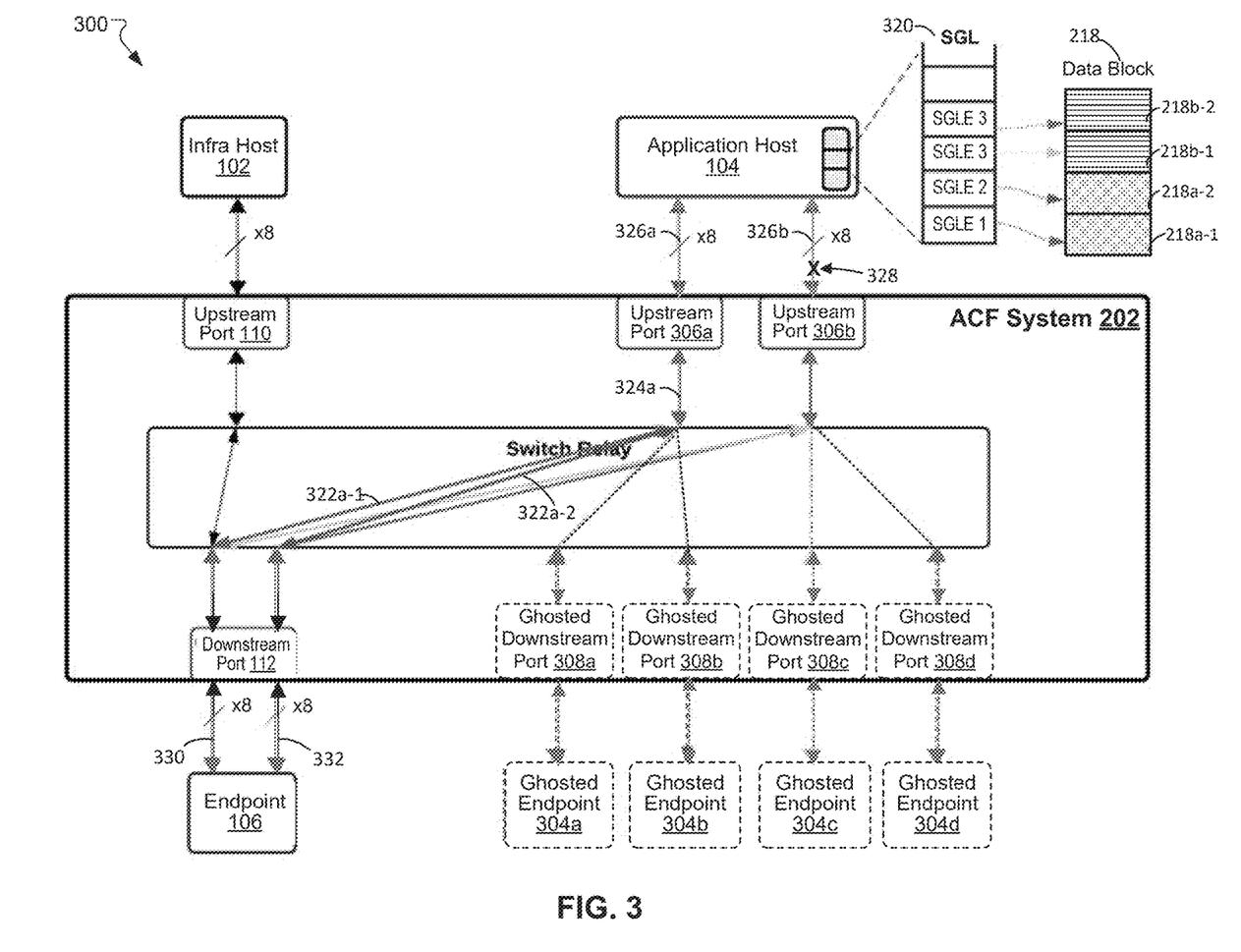
FIG. 3 includes an exemplary diagram of an alternative redundancy and failover system, according to some embodiments.

Additional levels of redundancy can be provided by applying the same concepts described herein to multiple links in the system and/or further subdividing the links into even "thinner" pipes (e.g., PCIe 4×4). For example, FIG. 3 illustrates an exemplary diagram of an alternative redundancy and failover system 300 that achieves additional link redundancy by bifurcating a downstream link between ACF 202 and endpoint device 106. The depicted example includes four ghost devices 304a, 304b, 304c, and 304d and corresponding ghosted downstream ports 308a, 308b, 308c, and 308d. Now sub-block 218a can be further subdivided into 218a-1 and 218a-2, and sub-block 218b can be subdivided into 218b-1 and 218b-2. Sub-blocks 218a-1 and 218a-2 can be sent in TLP packets through upstream PCIe link 326a and addressed to ghosted endpoint devices 304a and 304b, respectively. Sub-blocks 218b-1 and 218b-2 can be sent in TLP packets through upstream PCIe link 326b and addressed to ghosted endpoint devices 304c and 304d, respectively. ACF 202 may be configured to use four buffers (one for each sub-block) to simultaneously move the sub-blocks using SGL 320 which has at least four SGLEs. Again, the overall throughput can remain unaffected during normal operation when there are no PCIe link failures. The system 300 is able to have up to two failed links (e.g., one failed upstream link and one failed downstream link) and still maintain connectivity (e.g., at half the data rate).

Similar to FIG. 2, a 16-lane (×16) link can be bifurcated to two 8-lane (×8) upstream links 326a and 326b for transmitting data block 218 in TLP packets from application host 104 to ACF 202. When link 326b suffers a failure 328, however, TLP packets that would otherwise be sent over link 326b can be sent over link 326a and addressed to ghosted endpoint devices associated with link 326a (e.g., ghosted endpoint devices 304a and 304b). Any TLP packets addressed to the ghosted endpoint devices 304a, 304b, 304c, and 304d can be redirected by ACF 202 to endpoint 106. For example, TLP packets containing the data block 218 can pass through downstream port 112 to endpoint 106 (e.g., via paths 322a-1 and 322a-2). The speed change associated with this single link failure is generally trivial or at least tolerable.

The depicted embodiment includes two downstream PCIe links 330 and 332 for providing PCIe TLP packets to endpoint 106. When both downstream links 330 and 332 are available, the endpoint 106 can receive TLP packets over both links 330 and 332. When a failure occurs in one of the downstream links (e.g., link 330), however, the ACF can use the remaining downstream link (e.g., link 332) to send the TLP packets to the endpoint 106. In general, any TLP packets sent from application host 104 and addressed to one or more ghosted endpoint devices 304a, 304b, 304c, and/or 304d can be redirected by ACF 202 to endpoint 106 via any active downstream link(s) (e.g., link 330 and/or 332). Advantageously, when a link failure occurs in one of the downstream links 330 or 332, the other downstream link can still be functional, such that endpoint 106 is able to receive TLP packets from application host 104 (e.g., at a reduced data transfer rate).

While the example depicted in FIG. 3 includes two upstream PCIe links (links 326a and 326b) and two downstream PCIe links (links 330 and 332), it is understood that the system 300 can include any number of upstream PCIe links (e.g., 1, 2, 4, 6, or 8) and any number of downstream PCI links (e.g., 1, 2, 4, 6, or 8). In general, when one upstream PCIe link fails, the application host 104 can use the remaining upstream PCIe links and can address TLP packets to the ghosted endpoint devices associated with the remaining upstream PCIe links. Likewise, when a downstream PCIe link fails, ACF 202 can redirect any TLP packets addressed to the ghosted endpoint devices through any remaining downstream PCIe link(s).

In general, the number of ghosted endpoint devices used by the systems described herein (e.g., system 300 or 200) can depend on how many upstream and downstream PCIe links are utilized. The number of ghosted endpoint devices can be, for example, equal to a product of the number of upstream PCIe links and the number of downstream PCIe links. For example, when a system (e.g., system 300) has two upstream PCIe links and two downstream PCIe links, the system can have four ghosted endpoint devices (2×2=4). Likewise, when a system (e.g., system 200) has two upstream PCIe links and one downstream PCIe link, the system can have two ghosted endpoint devices (2×1=2).

Additionally or alternatively, in some examples, each downstream PCIe link can be associated with one or more ghosted endpoint devices. For example, downstream PCIe link 330 can be associated with ghosted endpoint devices 304a and 304b, and downstream PCIe link 332 can be associated with ghosted endpoint devices 304c and 304d. In this way, ACF 202 can be configured to redirect TLP packets addressed to ghosted endpoint devices 304a and 304b to endpoint 106 through link 330. Likewise, ACF 202 can be configured to redirect TLP packets addressed to ghosted endpoint devices 304c and 304d to endpoint 106 through link 332. When a downstream link failure occurs, ACF 202 can redirect TLP packets addressed to any ghosted endpoint device 304a, 304b, 304c, and/or 304d to endpoint 106 through the remaining downstream link(s).

Flowchart

Figure 4:
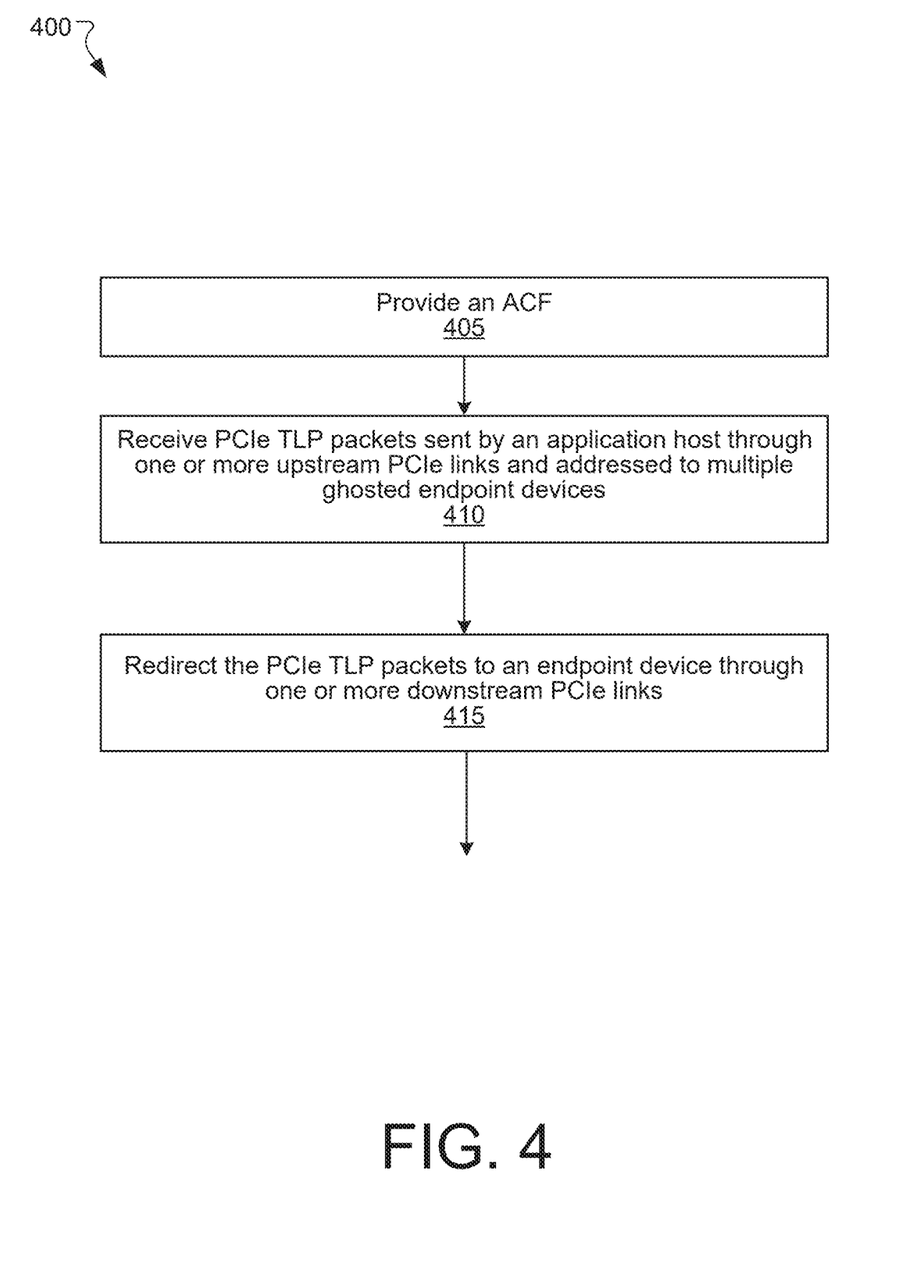
FIG. 4 includes an exemplary flowchart for achieving PCIe redundancy and recovery, according to some embodiments.

FIG. 4 is a flowchart of a method 400 of performing PCIe system redundancy and recovery, in accordance with certain examples. In some embodiments, process 400 may be implemented by a system (e.g., system 200 or 300) that includes an accelerated compute fabric (ACF) in communication with an infra host, an application host, and endpoint device, as described herein.

An ACF (e.g., ACF 202) is provided at step 405. The ACF may be or include a PCIe switch. The ACF is communicatively coupled using one or more upstream PCIe links (e.g., 226a, 226b) to an application host (e.g., 104). The ACF is also communicatively coupled using one or more downstream PCIe links to an endpoint device (e.g., 106).

At step 410, PCIe TLP packets are received at the ACF. These packets are sent by the application host through the one or more upstream PCIe links and are addressed to multiple ghosted endpoint devices. At step 415, the ACF is configured to redirect the PCIe TLP packets to the endpoint device through the one or more downstream PCIe links.

For example, as shown in FIG. 2, data block 218 may be encapsulated in TLP packets by application host 104 to be transferred to endpoint 106. While endpoint 106 is the target device, these packets are addressed to ghosted copies of the endpoint device 106 (e.g., ghosted endpoints 204a, 204b) and then redirected by the ACF 202 to the endpoint device 106. Advantageously, the systems and methods described herein can minimize or avoid performance issues associated with PCIe link failures.

ACF Structure

Figure 5:
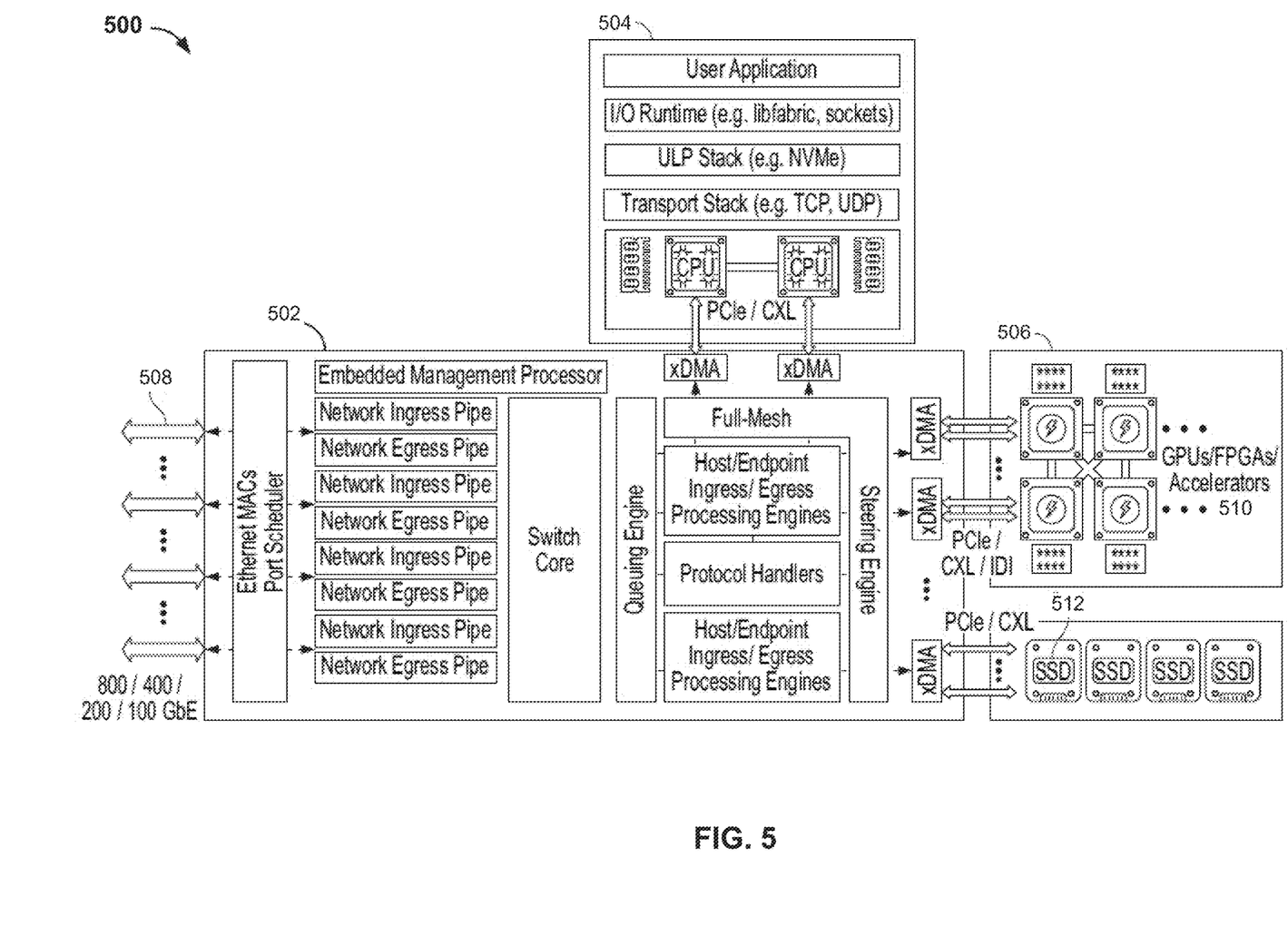
FIG. 5 includes an exemplary design of an accelerated compute fabric (ACF) system, according to some embodiments.

FIG. 5 illustrates an exemplary architecture 500 of an accelerated compute fabric (ACF) 502, also referred to as a server fabric adapter (SFA). In various examples, ACF 502 is a scalable and disaggregated I/O hub that may deliver multiple terabits-per-second of high-speed server I/O and network throughput across a composable and accelerated compute system. In some embodiments, ACF 502 may enable uniform, performant, and elastic scale-up and scale-out of heterogeneous resources. ACF 502 may also provide an open, high-performance, and standard-based interconnect (e.g., 800/400 GbE, PCIe Gen 5/6, CXL). ACF 502 may further allow I/O transport and upper layer processing under the full control of an externally controlled transport processor. In many scenarios, ACF 502 may use the native networking stack of a transport host and enable ganging/grouping of the transport processors (e.g., of ×86 architecture). In the present system, ACF 502 may include or act as a PCIe switch to provide the functionality described above in FIGS. 1-5. ACF 502 may be similar or identical to ACF 202, described herein.

As depicted in FIG. 5, ACF 502 connects to one or more controlling host CPUs 504, endpoints 506, and Ethernet ports 508. A controlling host CPU or controlling host 504 may provide transport and upper layer protocol processing, act as a user application "Master," and provide infrastructure layer services. An endpoint 506 (e.g., GPU/FPGA/accelerator 510, storage 512) may be producers and consumers of streaming data payloads that are contained in communication packets. An Ethernet port 508 is a switched, routed, and/or load balanced interface that connects ACF 502 to the next tier of network switching and/or routing nodes in the data center infrastructure.

In some embodiments, ACF 502 is responsible for transmitting data at high throughput and low predictable latency between:

Network and Host;
Network and Accelerator;
Accelerator and Host;

Accelerator and Accelerator; and/or

Network and Network.

The details of data transmission between various entities (e.g., network, host, accelerator) are described above, for example, with reference to FIGS. 2 and 3. However, in general, when transmitting data/packets between the entities, ACF 502 may separate/parse arbitrary portions of a network packet and map each portion of the packet to a separate device PCIe address space. In some embodiments, an arbitrary portion of the network packet may be a transport header, an upper layer protocol (ULP) header, or a payload. ACF 502 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, ACF 502 promotes the aggregate packet data movement capacity of a network interface into heterogeneous systems consisting of CPUs, GPUs/FPGAs/accelerators, and storage/memory. ACF 502 may also factor, in the various physical interfaces, capacity attributes (e.g., bandwidth) of each such heterogeneous systems/computing components.

In some embodiments, ACF 502 may interact with or act as a memory manager. ACF 502 provides virtual memory management for every device that connects to ACF 502. This allows ACF 502 to use processors and memories attached to it to create arbitrary data processing pipelines, load balanced data flows, and channel transactions towards multiple redundant computers or accelerators that connect to ACF 502.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer-readable medium. Storage device may be implemented in a distributed way over a network, for example as a server farm or a set of widely distributed servers, or may be implemented in a single computing device.

Although an example processing system has been described, embodiments of the subject matter, functional operations, and processes described in this specification can be implemented in other types of digital electronic circuitry, in tangibly-embodied computer software or firmware, in computer hardware, including the structures disclosed in this specification and their structural equivalents, or combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application-specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other units suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory, or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein are for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for achieving peripheral component interconnect express (PCIe) redundancy and recovery, the system comprising:
   an accelerated compute fabric (ACF) comprising a PCIe switch;
   an application host communicatively coupled to the ACF using one or more upstream PCIe links; and
   an endpoint device communicatively coupled to the ACF using one or more downstream PCIe links,
      wherein the application host is configured to send PCIe transaction layer packets (TLP) addressed to a plurality of ghosted endpoint devices through the one or more upstream PCIe links,
      wherein the ACF is configured to redirect the PCIe TLP packets to the endpoint device through the one or more downstream PCIe links, and
      wherein a total number of ghosted endpoint devices in the plurality of ghosted endpoint devices is equal to a product of (i) a number of links in the one or more upstream PCIe links and (ii) a number of links in the one or more downstream PCIe links.

2. The system of claim 1, wherein the ACF comprises one or more PCIe ports, and wherein the ACF uses the PCIe switch and the one or more PCIe ports to transfer data between the application host and the endpoint device.

3. The system of claim 1, wherein the application host comprises a computing device configured to perform operations for at least one of machine learning or artificial intelligence.

4. The system of claim 1, wherein the endpoint device comprises at least one of a graphics processing unit, a storage or memory element, a hard disk drive, a network interface card, or a field-programmable gate array.

5. The system of claim 1, wherein, to send a block of data to the endpoint device, the application host is configured to distribute portions of the block of data across the PCIe TLP packets, with each PCIe TLP packet addressed to a respective ghosted endpoint device from the plurality of ghosted endpoint devices.

6. The system of claim 1, wherein each upstream PCIe link from the one or more upstream PCIe links is associated with one or more respective ghosted endpoint devices from the plurality of ghosted endpoint devices.

7. The system of claim 1, wherein the application host is communicatively coupled to the ACF using a plurality of upstream PCIe links and, when none of the upstream PCIe links from the plurality of upstream PCIe links is in a failed state, the application host is configured to send the PCIe TLP packets through all the upstream PCIe links of the plurality of upstream PCIe links.

8. The system of claim 7, wherein, to send the PCIe TLP packets through all the upstream PCIe links from the plurality of upstream PCIe links, the application host is configured to address at least one of the PCIe TLP packets to each ghosted endpoint devices from the plurality of ghosted endpoint devices.

9. The system of claim 1, wherein the application host is communicatively coupled to the ACF using a plurality of upstream PCIe links and, when an upstream PCIe link from the plurality of upstream PCIe links is in a failed state, the application host is configured to send the PCIe TLP packets through one or more remaining upstream PCIe links of the plurality of upstream PCIe links.

10. The system of claim 9, wherein, to send the PCIe TLP packets through the one or more remaining upstream PCIe links, the application host is configured to address the PCIe TLP packets to one or more ghosted endpoint devices from the plurality of ghosted endpoint devices that are associated with the one or more remaining upstream PCIe links.

11. The system of claim 1, wherein the endpoint device is communicatively coupled to the ACF using a plurality of downstream PCIe links and, when none of the downstream PCIe links from the plurality of downstream PCIe links is in a failed state, the ACF is configured to redirect the PCIe TLP packets to the endpoint device through all the downstream PCIe links of the plurality of downstream PCIe links.

12. The system of claim 1, wherein the endpoint device is communicatively coupled to the ACF using a plurality of downstream PCIe links and, when a downstream PCIe link from the plurality of downstream PCIe links is in a failed state, the ACF is configured to redirect the PCIe TLP packets to the endpoint device through one or more remaining downstream PCIe links of the plurality of downstream PCIe links.

13. The system of claim 1, wherein each ghosted endpoint device from the plurality of ghosted endpoint devices is a ghost copy of the endpoint device.

14. The system of claim 1, further comprising a controlling host communicatively coupled to the ACF and configured to send data to the endpoint device.

15. A method of achieving peripheral component interconnect express (PCIe) redundancy and recovery, the method comprising:
- providing an accelerated compute fabric (ACF) comprising a PCIe switch, wherein the ACF is communicatively coupled using one or more upstream PCIe links to an application host, and wherein the ACF is communicatively coupled using one or more downstream PCIe links to an endpoint device,
- receiving, by the ACF, PCIe TLP packets sent by the application host through the one or more upstream PCIe links and addressed to a plurality of ghosted endpoint devices; and
- redirecting, by the ACF, the PCIe TLP packets to the endpoint device through the one or more downstream PCIe links,
- wherein a total number of ghosted endpoint devices in the plurality of ghosted endpoint devices is equal to a product of (i) a number of links in the one or more upstream PCIe links and (ii) a number of links in the one or more downstream PCIe links.

16. The method of claim 15, wherein receiving the PCIe TLP packets comprises receiving portions of a block of data across the PCIe TLP packets, with each PCIe TLP packet addressed to a respective ghosted endpoint device from the plurality of ghosted endpoint devices.

17. The method of claim 15, wherein the ACF is communicatively coupled to the application host using a plurality of upstream PCIe links, and, when none of the upstream PCIe links from the plurality of upstream PCIe links is in a failed state, the PCIe TLP packets are received by the ACF through all the upstream PCIe links of the plurality of upstream PCIe links.

18. The method of claim 15, wherein the ACF is communicatively coupled to the application host using a plurality of upstream PCIe links, and, when an upstream PCIe link from the plurality of upstream PCIe links is in a failed state, the PCIe TLP packets are received by the ACF through one or more remaining upstream PCIe links of the plurality of upstream PCIe links.

19. The method of claim 15, wherein the ACF is communicatively coupled to the endpoint device using a plurality of downstream PCIe links, and, when none of the downstream PCIe links from the plurality of downstream PCIe links is in a failed state, the PCIe TLP packets are redirected, by the ACF, to the endpoint device through all the downstream PCIe links of the plurality of downstream PCIe links.

20. The method of claim 15, wherein the ACF is communicatively coupled to the endpoint device using a plurality of downstream PCIe links, and, when a downstream PCIe link from the plurality of downstream PCIe links is in a failed state, the PCIe TLP packets are redirected, by the ACF, to the endpoint device through one or more remaining downstream PCIe links of the plurality of downstream PCIe links.

* * * * *